United States Patent [19]

Clarke

[11] Patent Number: 5,341,365
[45] Date of Patent: Aug. 23, 1994

[54] PASSIVE OPTICAL NETWORK

[75] Inventor: Donald E. A. Clarke, Colchester, England

[73] Assignee: British Telecommunications public limited company, London, England

[21] Appl. No.: 859,412

[22] PCT Filed: Nov. 17, 1990

[86] PCT No.: PCT/GB90/01758
§ 371 Date: May 27, 1992
§ 102(e) Date: May 27, 1992

[87] PCT Pub. No.: WO91/08623
PCT Pub. Date: Jun. 13, 1991

[30] Foreign Application Priority Data

Nov. 24, 1989 [GB] United Kingdom ............ 8926548

[51] Int. Cl.$^5$ .................................. H04J 3/14
[52] U.S. Cl. .......................... 370/17; 370/95.3; 359/110; 359/135; 359/136; 359/137
[58] Field of Search ............... 370/95.3, 17; 359/110, 359/135, 136, 137

[56] References Cited

U.S. PATENT DOCUMENTS 4,816,825  3/1989  Chan et al. ............... 340/825.5
5,153,764  10/1992  Faulkner et al. ............ 359/136

Primary Examiner—Douglas W. Olms
Assistant Examiner—Russell W. Blum
Attorney, Agent, or Firm—Nixon & Vanderhye

[57] ABSTRACT

A passive optical network includes a head-end station and a plurality of terminations. The terminations are responsive to control signals from the head-end station. The head-end station is arranged to receive frames having a predetermined bit rate and comprising signals transmitted by the terminations. Ranging pulses are transmitted from each of the terminations to the head-end station where the received ranging pulses are sampled at a high sampling rate greater than the predetermined bit rate. The data samples are applied to a processor which determines the phase and amplitude of the ranging pulses and generates control signals for the terminations to modify the phase or timing and amplitude of the transmissions from the terminations. A locally generated marker pulse may be applied to the incoming data frame before it is sampled in the head-end station, the marker pulse providing a phase and amplitude reference for use by the control processor.

11 Claims, 4 Drawing Sheets

PASSIVE OPTICAL NETWORK

BACKGROUND OF THE INVENTION

1. Field of the Invention

The present invention relates to a passive optical network, and in particular to the recovery of information from signals transmitted from terminations to a head-end station in such a network.

2. Related Art

The present applicant has developed a bit transport system (BTS) for use in a TPON (telephony on a passive optical network) network. In this BTS a head-end station broadcasts time division multiple access (TDMA) frames to all the terminations on the network. The transmitted frames include both traffic data and control data. Each termination recognises and responds to an appropriately addressed portion of the data in the broadcast frame and ignores the remainder of the frame.

In the upstream direction, each termination transmits data in a predetermined time slot and the data from the different terminations are assembled at the head-end into a TDMA frame of predetermined format.

One feature necessary to such a network is the provision of compensation for the differing delays and attenuation associated with the different distances of the various terminations from the head-end station. To this end, in the BTS each termination is arranged to transmit a ranging pulse timed to arrive in a respective predetermined portion of the upstream TDMA frame. The head-end station is arranged to monitor the timing, i.e. phase, and amplitude of the arrival of the pulse from each of the terminations and to return a servo-control signal to the termination to retard or advance its transmissions as appropriate and to adjust the launch power. This active fine ranging enables the BTS to ensure the stability of the upstream TDMA frame and, for example, to compensate for fluctuations in timing and received power due to such effects as changes in the operating temperature of the network. However this places severe demands on the design of the head-end station, requiring the measurement of the timing of received signals to within a fraction of a clock cycle and amplitude to within a fraction of a dB in real time.

SUMMARY OF THE INVENTION

According to a first aspect of the present invention, there is provided a method of operating a passive optical network including a head-end station and a plurality of terminations, the terminations being responsive to control signals from the head-end station and the head-end station being arranged to receive frames having a predetermined bit rate and comprising signals transmitted by the plurality of terminations, the method including transmitting respective ranging pulses from the terminations to the head-end station, sampling the received ranging pulses at a high sampling rate greater than the said predetermined bit rate and producing corresponding data samples, applying the data samples to processor means arranged to determine the respective phases of the ranging pulses relative to respective expected values and to determine the respective amplitudes of the ranging pulses, and generating respective control signals for the terminations to modify the phase and amplitude of transmissions from the terminations accordingly.

The present invention by sampling the received ranging pulses at a high sampling rate makes it possible to capture the phase and amplitude information from a ranging pulse in a form which can be readily processed to provide the necessary control signals. At the same time, the sampling process effectively provides a snapshot of the received pulse, which carries information relating to the overall shape of the pulse. This further information can be used to implement other control and diagnostic procedures simply by the provision of appropriate additional software for the processor.

There is residual phase jitter in the TDMA data received at the head-end due to varying path lengths and clock jitter in the terminations. With the method of the present invention, this jitter may be used effectively to increase the phase resolution by providing additional sampling points on the sloped edges of the received ranging pulses. The waveform data is then integrated and processed by a CPU over a period of time.

Preferably the method further comprises writing the data samples into a plurality of latches connected to a clock signal source arranged to clock the latches at a low clock rate less than the high sampling rate, the clock signal for each latch having a different respective phase offset, writing data samples from each latch into a respective serial memory, and reading data samples from the serial memories into the processor means.

Although a high sampling rate is necessary initially to capture all the required information from the ranging pulse, it is advantageous to convert the data samples to a lower bit rate, and in particular to the bit rate of the frames before it is accessed by the processor.

Preferably the head-end station includes a master-clock operating at one of the said low clock and the said high sampling rate and means to derive from the master-clock a clock signal at the other of the said low clock rate and the said high sampling rate and the plurality of latches are latched on the leading edge of a pulse of the clock signal at the low clock rate and the serial memories are latched on the trailing edge of the said pulse.

According to a further aspect of the present invention, there is provided a method of operating a passive optical network including a head-end station and a plurality of terminations, the terminations being responsive to control signals from the head-end station and the head-end station being arranged to receive frames comprising signals transmitted by the plurality of terminations, the method including superimposing on the received frames at the head-end station a locally generated marker pulse having a phase locked to a master-clock for the system, subsequently sampling a portion of the frame including the marker pulse to produce corresponding data samples, and applying the data samples to a control processor having its own local clock, the control processor being arranged to determine characteristics of received signals in the sampled portion of the frame relative to those of the marker pulse.

The further aspect of the present invention is preferably used in combination with the first aspect to analyse ranging pulses. It is not however limited to use in this manner and may, for example, be used to derive information from portions of the data frame other than the ranging pulses.

According to a still further aspect of the present invention, there is provided a head-end station for use in a passive optical network system and arranged to transmit control signals to a plurality of terminations, the terminations being responsive to control signals from the head-end station, and the head-end station being arranged to receive frames having a predetermined bit rate and comprising signals transmitted by the plurality of terminations, the head-end station including means to receive respective ranging pulses from the terminations, sampling means arranged to sample the received ranging pulses at a high sampling rate greater than the said predetermined bit rate and produce corresponding data samples, processor means responsive to data samples and arranged to determine the respective phase of the ranging pulses relative to respective expected values and to determine the respective amplitudes of the ranging pulses, and control signal generating means arranged to generate respective control signals to modify the phase and amplitude of transmissions from respective terminations.

Preferably the head-end station further comprises a plurality of latches connected to a clock signal source arranged to clock the latches at a low clock rate less than the said high sampling rate, the clock signal for each latch having a different respective phase offset, and a respective serial memory for each of the plurality of latches, data samples being written in use from each latch into the respective serial memory, and each serial memory being reset by a reset pulse having a corresponding respective phase offset, thereby converting the data samples from the high sampling rate to the said low clock rate.

Preferably the serial memories comprise dual port serial FIFOs.

Preferably the head-end station further includes marker means disposed upstream of the sampling means and arranged to superimpose a marker pulse of predetermined phase and amplitude on the received frames and thereby provide a reference for use by the processor means.

BRIEF DESCRIPTION OF THE DRAWINGS

A passive optical network in accordance with the present invention will now be described in detail with reference to the accompanying drawings in which.

DETAILED DESCRIPTION OF EXEMPLARY EMBODIMENTS

A TPON network comprises a head-end station 1, a number of terminations 2, and a passive optical fibre network 3 linking the head-end station 1 to the terminations 2. Although, for clarity, only three terminations are shown, in practice many more terminations will be connected to a single head-end station. Typically the head-end station is located in a local exchange and the terminations 2 are subscriber stations in domestic or commercial premises or street cabinets in the neighbourhood of the local exchange.

The head-end station 1 broadcasts data over the fibre network 3 as time division multiple access (TDMA) frames having a predetermined format. The frames include control channels addressed to specific ones of the terminations 2 to control, amongst other parameters, the amplitude and phase (timing) of the optical signals transmitted onto the fibre network 3 by the terminations 2.

In the upstream direction, each termination 2 transmits data in a predetermined time slot, which data is assembled into a TDMA frame at the head-end station 1. Since the TPON network is synchronous in operation it is necessary to control the timing of the terminations both to compensate for the different delays associated with different positions of the terminations on the fibre network 3 and to correct for any variation in the delay and amplitude arising, for example, from local fluctuations in the temperature of the network.

Figure 1:
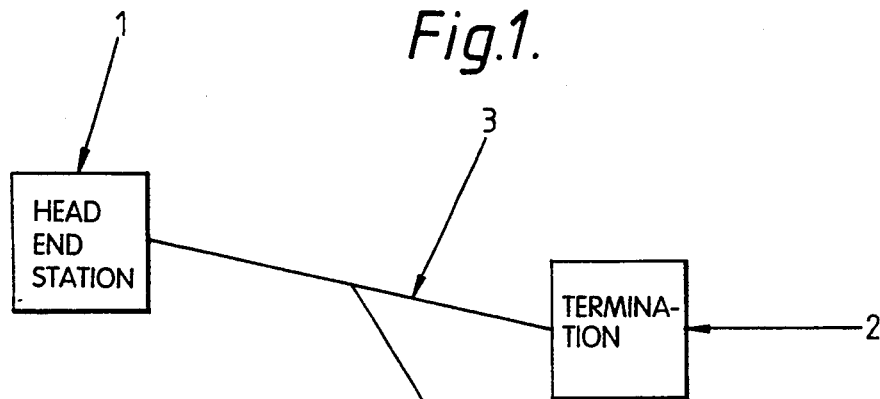
FIG. 1 is a block diagram showing a TPON network.
Figure 2:
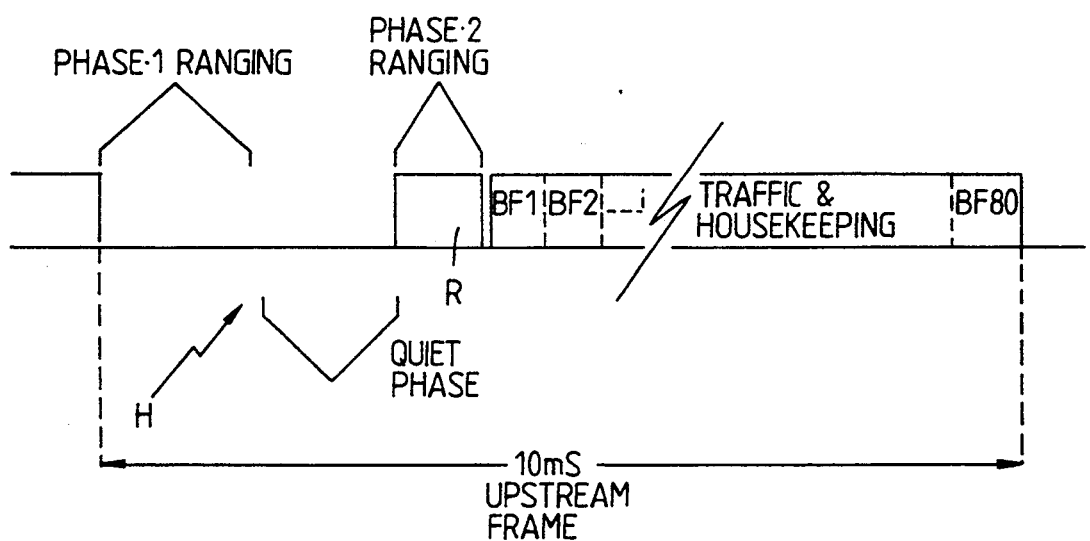
FIG. 2 is a diagram showing the structure of an upstream TDMA frame.

FIG. 2 shows the format of the return frame. Traffic data is transmitted to the head-end station in 80 basic frames BF1 BF80. The basic frames BF1 BF80 are preceded by a header H which includes a phase-2 ranging section R 720 bits long. Each termination 2 is arranged to transmit onto the fibre network 3 a ranging pulse timed to arrive at a respective predetermined position within the ranging section R. Using the circuit described in further detail below the head-end station 1 determines the phase of each arriving ranging pulse relative to the respective predetermined positions of the ranging pulses within the ranging section R, and then transmits control signals to the respective termination 2 to retard or advance the timing of the transmission from that termination 2 in order to minimize the phase offset between the received data from that termination and the intended position of that data within the return frame structure.

Figure 3:
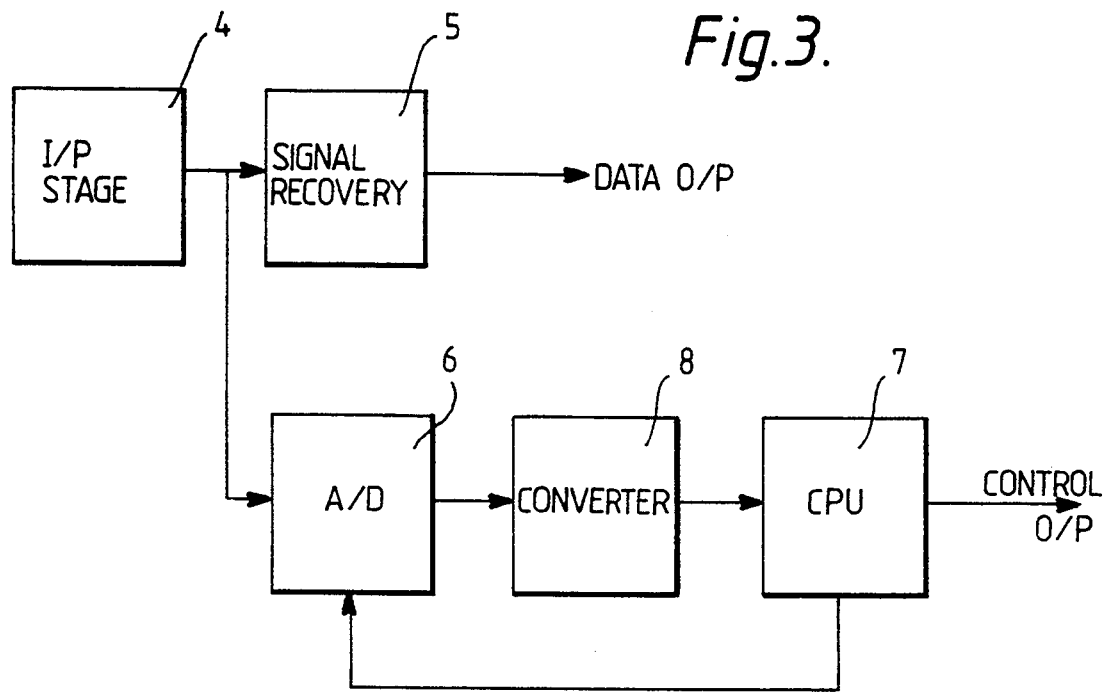
FIG. 3 is a block diagram of a head-end station.

FIG. 3 shows the structure of the head-end station 1. The incoming optical signals are received by an input stage 4 which includes a conventional photo-electric detector followed by a linear gain block A (see FIG. 4). The output from the input stage 4 is branched, going both to a signal recovery stage 5 and to an A/D sampler 6. The sampler 6 operates under the control of a CPU 7 to sample any selected portion of the incoming signals. In the present example, the sampler 6 is arranged to sample the portion R of the incoming frame containing the ranging pulses and produce corresponding samples in the form of 8-bit data words (the data). The output from the sampler 6 is taken to a converter 8 which converts the data to the lower clock rate of a masterclock for the head-end station. The CPU 7 calculates from the data the phase and amplitude of the ranging pulses. These parameters are compared with expected values and, where necessary, control signals generated for a corresponding termination 2 to retard or advance the timing of transmissions from the termination 2 to minimize the phase offset, and/or to increase or reduce the amplitude of the transmissions until the received ranging pulse from that termination 2 has an amplitude falling within predetermined limits.

Figure 5:
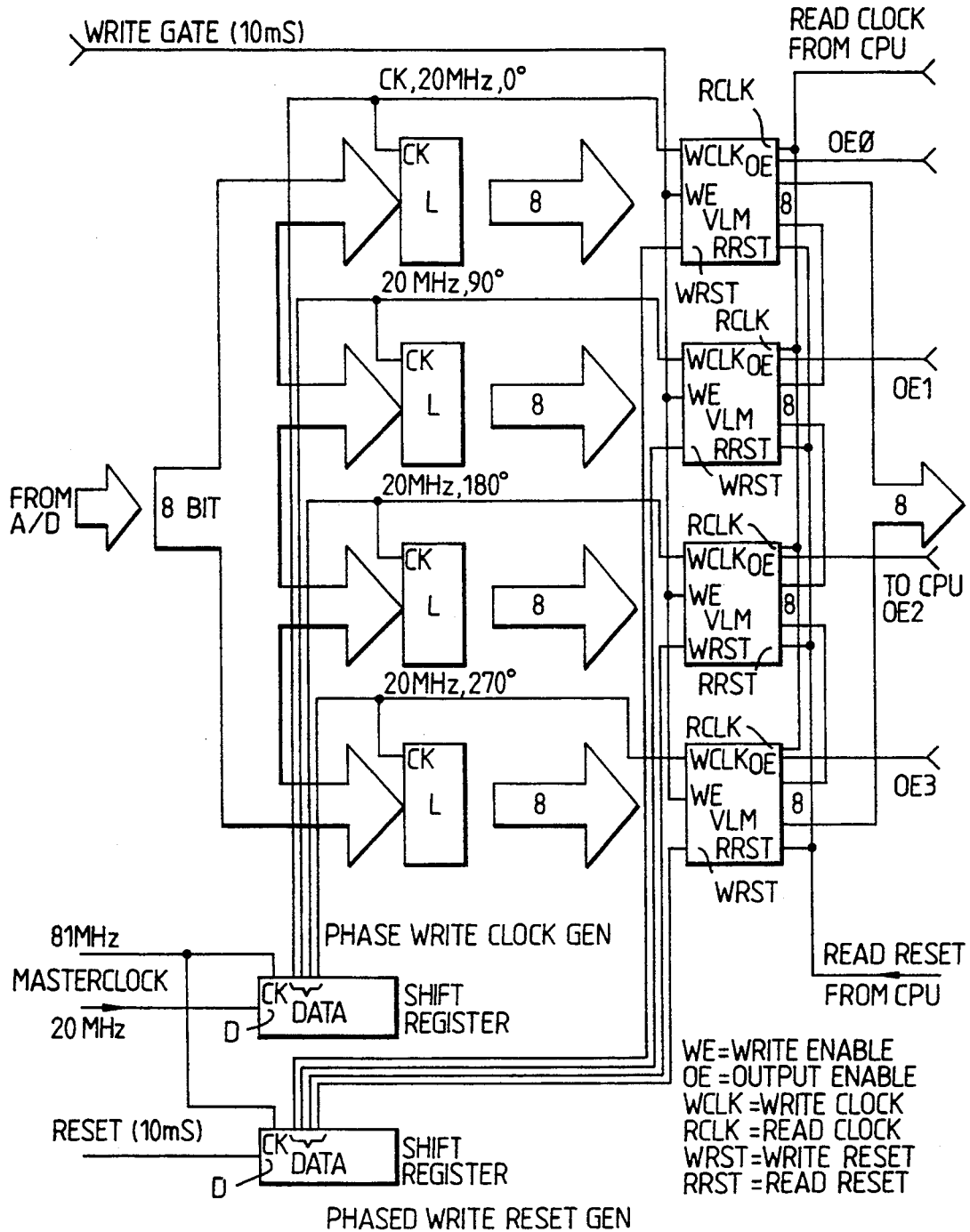
FIG. 5 is a block diagram showing the converter of FIG. 3 in greater detail.

FIG. 5 shows the converter in greater detail. The high-speed sampler 6 provides an input to the converter 8 comprising 8-bit data words having a clock rate, in the present example, of 81.92 MHz. The input to the converter 8 is fed in parallel to four 8-bit latches L. The latches L are locked to the masterclock with differing phase offsets of 0, 90, 180, and 270 degrees respectively. The output from each latch is fed to a 8-bit dual port serial FIFO of the type known as a video line memory VLM. In order to ensure that the data written to the video line memories is correctly ordered the memories are reset by pulses having a predetermined phase with respect to the write clock. The write clock and reset pulses with appropriate phases are derived from respective shift registers, as shown in FIG. 5. The video line memories VLM are polled consecutively by the CPU 7 so that the data received at the converter 8 as four 8-bit data words with a clock rate of substantially 80 MHz are read into the CPU as a single 32-bit word at a lower clock rate of substantially 20 MHz. A write gate signal having the same periodicity as the received TDMA frames is applied to the write enable inputs WE of the video line memories. The write gate is used to select the portion of the TDMA frame which is written into the video line memories.

Figure 6:
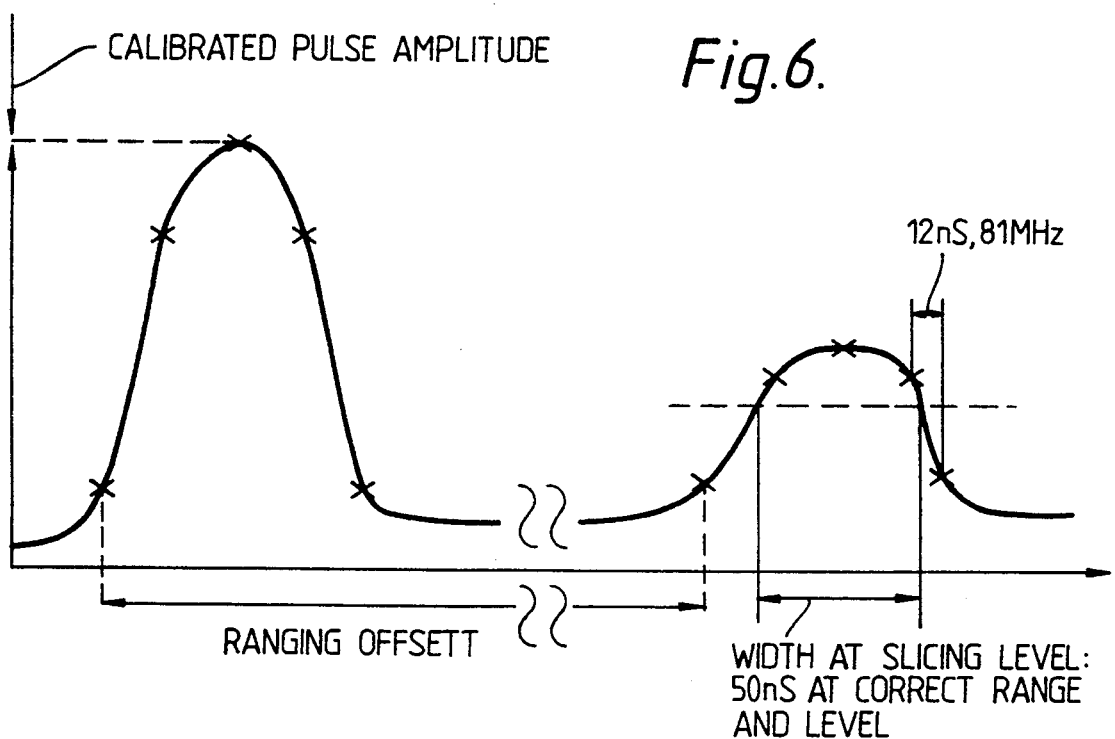
FIG. 6 is a diagram showing the sampling of the ranging pulse.

The head-end station 4 includes a masterclock operating at the lower clock rate and the components of the head-end station, together with the rest of the TPON system are locked to the masterclock. In an alternative arrangement, the head-end station includes a clock operating at the high sampling rate of substantially 80 MHz and the 20 MHz system clock is derived from the 80 MHz clock. However although the control systems provided for the head-end station and the network ensure that operation is synchronous at the system clock rate it is not possible to provide similarly synchronous operation at the higher clock rate used in the high-speed sampler. As shown in FIG. 6 this rate is four times the masterclock rate in order to capture the necessary phase and amplitude information from the ranging pulse. In order to provide the phase reference required at the higher sampling rate a marker pulse is superimposed on the incoming data upstream of the high-speed sampler 6.

Figure 4:
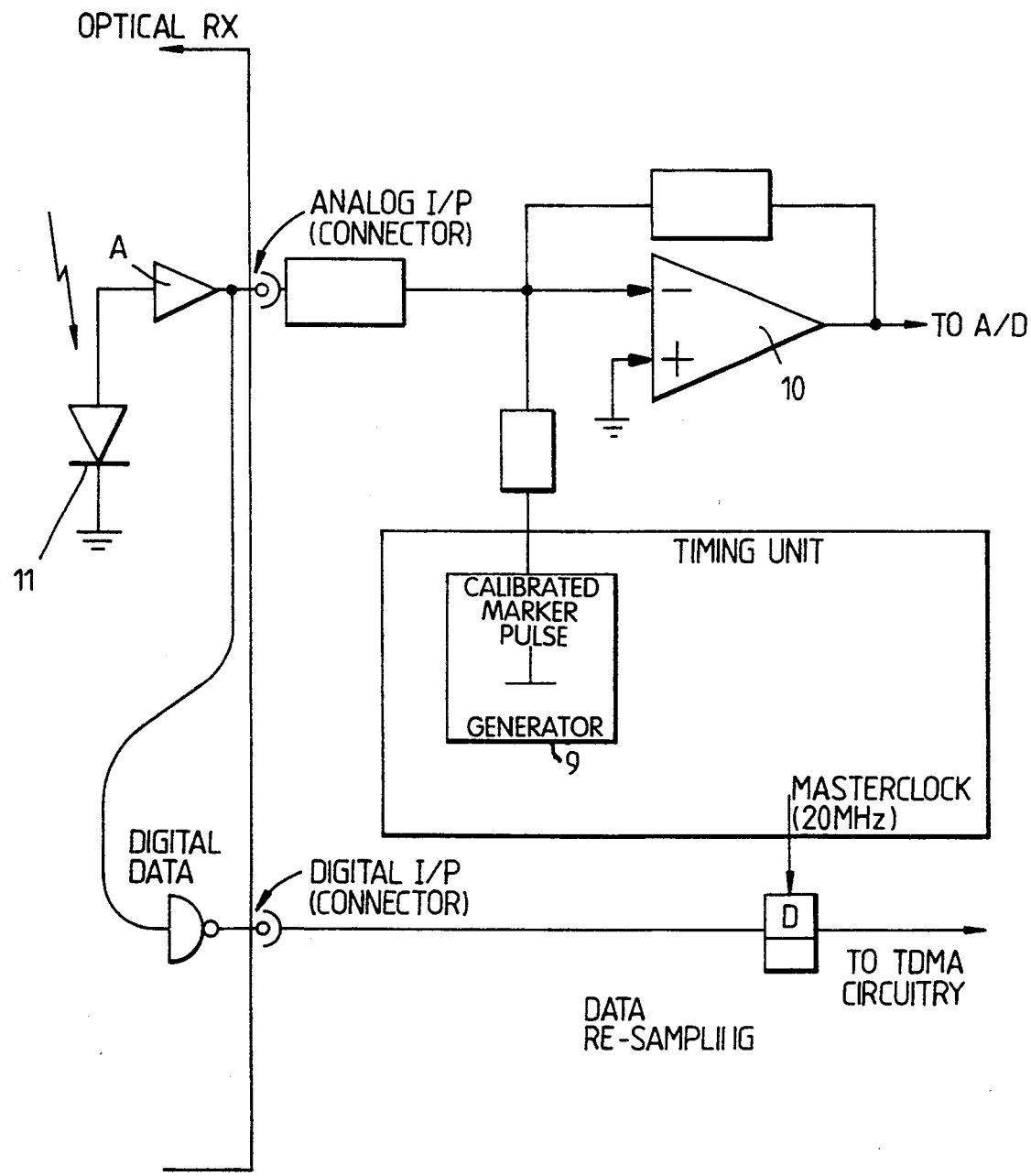
FIG. 4 is a block diagram showing the input stage in greater detail.

As shown in FIG. 4 the input stage includes a marker pulse generator 9, a photodetector 11 and a summing amplifier 10. The marker pulse generator 9 produces a marker pulse having a phase locked to the masterclock. The marker pulse is locally summed with the analogue input signal at the summing amplifier 10 and so appears in the data output from the sampler 6. The CPU 7 then detects the phase of a given sampled ranging pulse with respect to the marker pulse and compares this with the expected value to determine the appropriate phase control signal. Similarly, the marker pulse provides an amplitude reference for use by the CPU 7. The CPU 7 includes its own asynchronous clock. The execution of the CPU program is synchronised using 10 mS interrupts (the TDMA frame rate) and data is read from the VLM's at a rate much lower than the system clock, controlled by the interrupts.

I claim:

1. A method of operating a passive optical network including a head-end station and a plurality of terminations, the terminations being responsive to control signals from the head-end station and the head-end station being arranged to receive frames having a predetermined bit rate and comprising signals transmitted by the plurality of terminations, the method including:
   transmitting respective ranging pulses from the terminations to the head-end station,
   sampling the received ranging pulses at a high sampling rate greater than said predetermined bit rate and producing corresponding data samples,
   applying the data samples to processor means arranged to integrate the data samples to determine the respective phases of the ranging pulses relative to respective expected values and to determine the respective amplitudes of the ranging pulses, and
   generating respective control signals for the terminations to modify the phase and amplitude of transmissions from the terminations accordingly.

2. A method of operating a passive optical network including a head-end station and a plurality of terminations, the terminations being responsive to control signals from the head-end station and the head-end station being arranged to receive frames having a predetermined bit rate and comprising signals transmitted by the plurality of terminations, the method including:
   transmitting respective ranging pulses from the terminations to the head-end station,
   sampling the received ranging pulses at a high sampling rate greater than the said predetermined bit rate and producing corresponding data samples,
   applying the data samples to processor means arranged to determine the respective phases of the ranging pulses relative to respective expected values and to determine the respective amplitudes of the ranging pulses.
   generating respective control signals for the terminations to modify the phase and amplitude of transmissions from the terminations accordingly:
   writing the data samples into a plurality of latches connected to a clock signal source arranged to clock the latches at a low clock rate less than the high sampling rate, the clock signal for each latch having a different respective phase offset,
   writing data samples from each latch into a respective serial memory, and
   reading data samples from the serial memories into the processor means.

3. A method according to claim 2, in which the low clock rate is substantially the same as the bit rate of the received data frames.

4. A method according to claim 2 including deriving from a masterclock operating at one of the said low clock rate and the said high sampling rate a clock signal at the other of the said low clock rate and the said high sampling rate,
   latching the plurality of latches on the leading edge of a pulse of the clock signal at the low clock rate, and
   latching the serial memories on the trailing edge of said pulse.

5. A method of operating a passive optical network including a head-end station and a plurality of terminations, the terminations being responsive to control signals from the head-end station and the head-end station being arranged to receive frames comprising signals transmitted by the plurality of terminations, the method including:
   superimposing on the received frames at the head-end station a locally generated marker pulse having a phase locked to a masterclock for the system,
   subsequently sampling a portion of the frame including the marker pulse to produce corresponding data samples, and
   applying the data samples to a control processor having its own local clock, the control processor being arranged to determine characteristics of received signals in the sampled portion of the frame relative to those of the marker pulse.

6. A head-end station for use in a passive optical network system and arranged to transmit control signals to a plurality of terminations, the terminations being responsive to control signals from the head-end station, and the head-end station being arranged to receive frames having a predetermined bit rate and comprising signals transmitted by the plurality of terminations, the head-end station including:
  means to receive respective ranging pulses from the terminations,
  sampling means arranged to sample the received ranging pulses at a high sampling rate greater than the said predetermined bit rate and produce corresponding data samples,
  processor means responsive to said data samples and arranged to integrate the data samples to determine the respective phase of the ranging pulses relative to respective expected values and to determine the respective amplitudes of the ranging pulses, and
  control signal generating means arranged to generate respective control signals to modify the phase and amplitude of transmissions from respective terminations.

7. A head-end station for use in a passive optical network system and arranged to transmit control signals to a plurality of terminations, the terminations being responsive to control signals from the head-end station, and the head-end station being arranged to receive frames having a predetermined bit rate and comprising signals transmitted by the plurality of terminations, the head-end station including:
  means to receive respective ranging pulses from the terminations,
  sampling means arranged to sample the received ranging pulses at a high sampling rate greater than the said predetermined bit rate and produce corresponding data samples,
  processor means response to said data samples and arranged to determine the respective phase of the ranging pulses relative to respective expected values and to determine the respective amplitudes of the ranging pulses,
  control signal generating means arranged to generate respective control signals to modify the phase and amplitude of transmissions from respective terminations,
  a plurality of latches connected to a clock signal source arranged to clock the latches at a low clock rate less than the said high sampling rate, the clock signal for each latch having a different respective phase offset, and
  a respective serial memory for each of the plurality of latches, data samples being written in use from each latch into the respective serial memory, and each serial memory being reset by a reset pulse having a corresponding respective phase offset, thereby converting the data samples from the high sampling rate to the said low clock rate.

8. A head-end station for use in a passive optical network system and arranged to transmit control signals to a plurality of terminations, the terminations being responsive to control signals from the head-end station, and the head-end station being arranged to receive frames having a predetermined bit rate and comprising signals transmitted by the plurality of terminations, the head-end station including:
  means to receive respective ranging pulses from the terminations,
  sampling means arranged to sample the received ranging pulses at a high sampling rate greater than the said predetermined bit rate and produce corresponding data samples,
  processor means response to said data samples and arranged to determine the respective phase of the ranging pulses relative to respective expected values and to determine the respective amplitudes of the ranging pulses,
  control signal generating means arranged to generate respective control signals to modify the phase and amplitude of transmissions from respective terminations,
  a masterclock operating at one of the said low clock rate and the said high sampling rate;
  means to derive from the masterclock a clock signal at the other of the said low clock rate and the said high sampling rate, the plurality of latches being latched on the leading edge of the pulse of the clock signal at the low clock rate and the serial memories being latched on the trailing edge of the said pulse.

9. A head-end station according to claim 7, in which the serial memories comprise dual port serial FIFOs.

10. A head-end station for use in a passive optical network system and arranged to transmit control signals to a plurality of terminations, the terminations being responsive to control signals from the head-end station, and the head-end station being arranged to receive frames having a predetermined bit rate and comprising signals transmitted by the plurality of terminations, the head-end station including:
  means to receive respective ranging pulses from the terminations,
  sampling means arranged to sample the received ranging pulses at a high sampling rate greater than the said predetermined bit rate and produce corresponding data samples,
  processor means response to said data samples and arranged to determine the respective phase of the ranging pulses relative to respective expected values and to determine the respective amplitudes of the ranging pulses,
  control signal generating means arranged to generate respective control signals to modify the phase and amplitude of transmissions from respective terminations; and
  marker means disposed upstream of the sampling means and arranged to superimpose a marker pulse of predetermined phase and amplitude on the received frames and thereby provide a reference for use by the processor means.

11. A method of determining the phase of ranging pulses returned to a head-end station from terminations in a TDMA passive optical network and which pulses exhibit residual jitter and noise, said method comprising the steps of:
  sampling said ranging pulses at multiple times within a single pulse and storing said samples to provide range pulse waveform data;
  repeating said sampling and storing steps over a period of time to provide additional range pulse waveform data; and
  integrating and processing said waveform data over a period of time to provide processed returning ranging pulse waveform data that exhibits reduced jitter and noise and increased phase resolution.

* * * * *